United States Patent [19]

Ezell et al.

[11] Patent Number: 4,496,188
[45] Date of Patent: Jan. 29, 1985

[54] FLOATING CAB

[75] Inventors: James J. Ezell, Clovis; Paul V. Garin, III, San Mateo, both of Calif.

[73] Assignee: A G Motor Corp., Fresno, Calif.

[21] Appl. No.: 457,725

[22] Filed: Jan. 13, 1983

[51] Int. Cl.³ .............................................. B62D 27/04
[52] U.S. Cl. ................................. 296/190; 180/89.12;
180/89.19; 296/31 P
[58] Field of Search ............................. 296/190, 31 P;
180/89.14, 89.13, 89.16, 89.19, 89.18, 89.12

[56] References Cited

U.S. PATENT DOCUMENTS

| | | | |
|---|---|---|---|
| 3,990,737 | 11/1976 | Palmer | 296/190 |
| 4,082,343 | 4/1978 | Hurt et al. | 180/89.12 |
| 4,153,290 | 5/1979 | Barenyi et al. | 296/31 P |
| 4,351,554 | 9/1982 | Miller | 180/89.14 |

Primary Examiner—Richard A. Bertsch
Attorney, Agent, or Firm—Freilich, Hornbaker, Rosen & Fernandez

[57] ABSTRACT

A vehicle cab is described, which includes a plastic molded cab housing (16) that is securely held to a steel chassis (12), without concentrated stresses on the plastic housing that could damage it. The plastic cab housing (16) has vertical side walls (34) and a horizontally-extending flange (36) at the bottom. A metal frame (22) includes a beam that extends along the periphery of the housing and that lies under the plastic housing flange. A rubber spacer (24) has a top wall (42) lying over the housing flange, a bottom wall (44) sandwiched between the housing flange and the frame, and a connecting wall (48) connecting the top and bottom walls and lying beside the outer edge of the flange. A metal clamp (26) has a top part lying on the top of the spacer top wall, and a side clamp part that is fastened to the metal frame. Thus, the housing (16) is prevented from movement in any direction relative to the steel frame, and yet all holding forces are applied through a rubber spacer (24) to avoid concentrated forces.

3 Claims, 3 Drawing Figures

FLOATING CAB

BACKGROUND OF THE INVENTION

Vehicle cabs have generally been constructed of sheet metal, and directly fastened through bolts to a steel frame that attached to the vehicle chassis. Fiberglass could be used in constructing the sides and top of the cab to enable more complex shapes to be used at lower costs and to guard against corrosion. However, fiberglass or other plastic cabs are not compatible with the steel frames and flooring, in that large localized loads that can be withstood by steel members could cause cracking of the fiberglass. A truck cab which could employ a plastic housing for its side and top wall, while enabling the use of steel or other metals for the frame and for the flooring to which the cab must be attached, would enable the use of more complex and decorative shapes for the cab at low cost, while obtaining other advantages of plastic such as corrosion resistance, light weight, and minimization of noise.

SUMMARY OF THE INVENTION

In accordance with one embodiment of the invention, a truck cab is provided which can utilize plastic for most of the walls, without creating the likelihood of damage to the cab when used with a steel frame. The cab includes a plastic molded cab housing having largely vertical side walls and a largely horizontally extending flange at the bottom. A metal frame extends around the periphery of the cab and lies under it. The frame is coupled to the housing through a spacer formed of resilient material such as rubber, and then a clamp holds the parts together. By this arrangement, the plastic housing flange is captured at its top, bottom, and edge by a resilient spacer so it is not in direct contact with any hard member that would create local stresses on the plastic, and yet the clamp which holds the spacer in place prevents movement of the housing in both vertical and horizontal directions.

Where the cab has a steel floor, the spacer can be a rubber extrusion of a largely "E" shape with top and bottom rubber walls lying over the plastic flange and the frame, and with the middle rubber wall lying between the plastic flange and the steel floor. This not only isolates the plastic housing from the steel floor, but also isolates the floor from vibrations while still securely holding it in place.

DESCRIPTION OF THE PREFERRED EMBODIMENT

Figures 1, 2, 3:
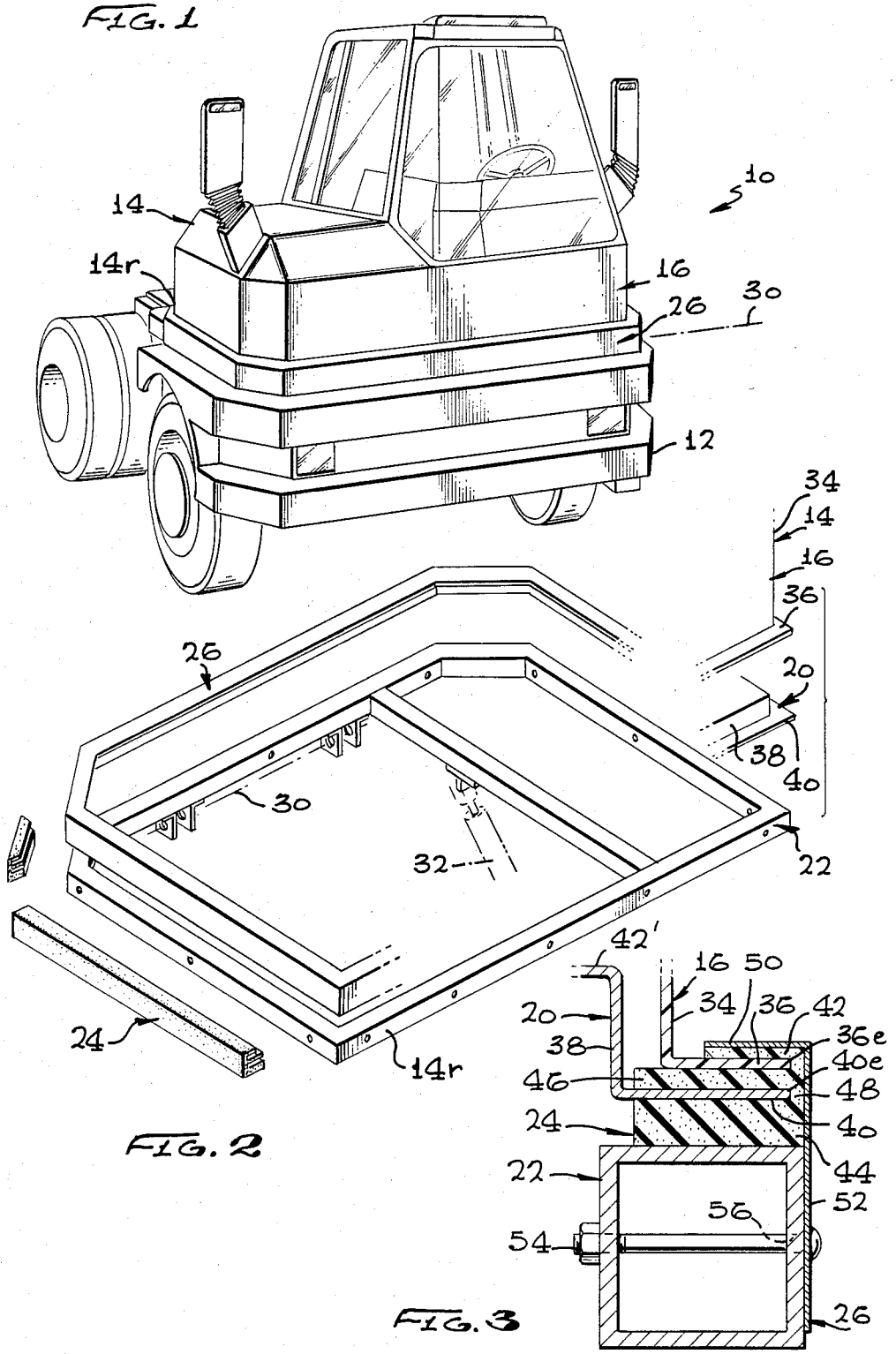
FIG. 1 is a front, top, perspective view of a truck constructed in accordance with the present invention.
FIG. 2 is a rear, top, exploded perspective view of the frame and portions of other components of the cab of the truck in FIG. 1.
FIG. 3 is a sectional view of a bottom portion of the cab of FIG. 2.

FIG. 1 illustrates a truck 10, of the yard tractor type which is used to haul containers around a railroad yard. The truck includes a steel chassis 12 supported on wheels, and a cab 14 supported on the chassis. The cab 14 includes a housing 16 formed largely of fiberglass plastic which is molded to a complex shape that provides a very wide field of view for a driver who sits in the cab. While the molded fiberglass or other plastic housing has many advantages over the traditional sheet steel housing, care must be exercised in mounting it over the steel chassis to avoid damage to the housing.

As shown in FIG. 2, the cab includes a floor 20 formed of a steel plate that lies at the bottom of the housing 16, and a steel frame 22 which supports the weight of the housing 16 and floor 20 and which is, in turn, supported on the steel chassis 12. A coupling or spacer 24 of rubber separates the different parts of the cab, and the clamp 26 holds the assembly of parts together. It may be noted that the particular frame 22 is pivotally mounted about an axis 30 on the chassis 12 so that an actuator 32 can lift the rear 14r of the cab to service the engine and other parts that lie under the cab.

When the various parts of the cab are assembled, they are arranged in the manner as shown in FIG. 3. The housing 16 has substantially vertical side walls 34 and has a horizontally extending flange 36 at the bottom of the side walls. In this arrangement, the flange 36 extends outwardly from the side walls. The steel plate floor 20 is formed with a down-step 38 and a horizontally extending flange 40 at the bottom to raise the middle portion 42 to provide room for equipment under the floor. The frame 22 is formed by a box beam with its length direction extending along the periphery of the cab. The spacer 24 has an "E" shape, with a top wall 42 lying on top of the cab flange 36, a bottom wall 44 lying on top of the frame 22 and under the cab flange, and a middle wall 46 that lies sandwiched between the housing flange 36 and the floor flange 40. The spacer also has a vertically-extending connecting wall 48 that connects the three horizontally extending spacer walls 42–46, and which substantially abuts the extreme edges 36e, 40e of the housing and floor flanges. The clamp 26 includes a horizontally-extending top part 50 that lies against the top wall 42 of the spacer to hold it down, and a vertically-extending side wall 52. The side wall 52 has an upper portion abutting the spacer connecting wall 48 to prevent its lateral shift, and a lower part that is mounted to the frame 22. A group of fasteners 54 pass through holes 56 in the frame and in the clamp to fasten them together.

In the arrangement shown in FIG. 3, the cab housing 16 is securely held in place against substantial movements in vertical or horizontal directions relative to the frame 22, and yet no localized forces are applied to the housing flange 36 that could cause cracking of it. This is because the rubber spacer walls distribute the hold-down forces along wide areas of the housing flange 36. Also, shocks encountered by the frame 22 are considerably dampened before application to the cab housing by use of the rubber spacers. Although the steel floor could be directly connected to the steel frame 22, the presence of rubber spacer walls around the steel plate helps to minimize the transmission of shocks and vibration to the steel floor. All of this is accomplished with a minimum number of different parts that must be fastened in place, since a single E-shaped extrusion serves to cushion both the housing and the floor against both vertical and lateral movements.

The frame 22 can be constructed as a unitary member by welding together several lengths of a box beam. The clamp 26 can be similarly constructed as a single member that extends completely about the frame. The spacer 24 can be an extruded member cut into several lengths, each extending along each straight portion of the frame, with six different lengths of the spacer being used in the frame shown in FIG. 2. The housing 16 can be constructed with a flange 36 that extends continuously around the bottom of the housing.

Thus, the invention provides a truck cab with a plastic molded cab housing that is securely held to a steel chassis, in a manner that avoids localized high stresses on the plastic cab that could damage it. This can be accomplished by constructing the plastic housing with a vertical flange at the bottom that lies over a steel frame, and providing a spacer of soft resilient material such as rubber that has a bottom wall lying between the housing flange and frame, a top wall lying on top of the housing flange, and a connecting wall connecting the top and bottom spacer walls and abutting the edge of the housing flange. A clamp which holds the parts together, includes a top part or flange that lies against the top wall of the spacer, and a side wall with an upper portion that abuts the connecting wall of the spacer and a bottom portion that is connected to the frame. A steel floor for the cab can be provided with a peripheral portion that lies between the housing flange and frame and is separated from them by spacer walls. The spacer can be constructed as an extrusion of E-shaped cross section, to couple the housing flange, floor, and frame in conjunction with the clamp, using a minimum of simple and reliable parts.

Although particular embodiments of the invention have been described and illustrated therein, it is recognized that modifications and variations may readily occur to those skilled in the art and consequently, it is intended that the claims be interpreted to cover such modifications and equivalents.

We claim:

1. In a vehicle with a metal chassis, the improvement of a vehicle cab comprising:
   a plastic molded cab housing having largely vertical side walls and a largely horizontally-extending flange at the bottom of the side walls;
   a metal frame lying under said cab housing flange, for coupling to said vehicle chassis;
   a spacer formed of resilient material, and having a top wall lying over said cab housing flange, a bottom wall lying between said frame and said flange, and a connecting wall connecting said top and bottom walls and lying beside the edge of said flange;
   a metal clamp which includes a top part lying on top of said spacer top wall, and a side part with an upper portion lying against said connecting wall on a side thereof which is opposite said flange edge and a lower portion which lies against said frame, said clamp closely surrounding said connecting wall of said resilient spacer to resist sideward shifting of the cab, but said clamp being substantially free of direct contact with said cab flange; and
   a plurality of fasteners which fasten said clamp to said frame.

2. The improvement described in claim 1 including:
   a metal floor for covering the bottom of said cab housing, said floor having a periphery lying between said cab housing and frame; and wherein
   said spacer has a middle wall lying between said top and bottom walls and connected to said connecting wall, said middle wall lying under said plastic housing flange, and said floor periphery being sandwiched between said middle and bottom walls of said spacer.

3. A cab comprising:
   a plastic molded cab housing having primarily vertical side walls and a flange extending horizontally outwardly from the bottom of said side walls;
   a metal cab floor having an edge portion lying under said cab flange;
   a frame which includes an elongated beam extending along and lying directly under the edge portion of said floor;
   a spacer of softer material than said cab floor and frame, said spacer having a substantially E-shaped cross-section, with a horizontally-extending top wall lying on top of said housing flange, a horizontally-extending middle wall lying between said flange and said edge portion of said floor, a horizontally-extending bottom wall lying between said floor edge portion and said frame, and a vertically-extending connecting wall connecting said top, middle, and bottom walls and lying beside the edges of said cab flange and said floor;
   a clamp having an upper clamp flange lying on said top spacer wall and a side clamp wall extending downwardly from the clamp flange and lying on the outside of said spacer outer wall and said frame; and
   means for fastening said side clamp wall to said frame.

* * * * *